US008096409B2

(12) United States Patent
Wipf et al.

(10) Patent No.: US 8,096,409 B2
(45) Date of Patent: Jan. 17, 2012

(54) APPARATUS AND METHOD FOR TRANSPORTING PRODUCTS, HAVING A LINEAR DRIVE MECHANISM

(75) Inventors: Alfred Wipf, Jestetten (DE); Heinrich Loecht, Backnang (DE); Martin Siering, Erfurt (DE)

(73) Assignee: Robert Bosch GmbH, Stuttgart (DE)

( * ) Notice: Subject to any disclaimer, the term of this patent is extended or adjusted under 35 U.S.C. 154(b) by 308 days.

(21) Appl. No.: 12/497,988

(22) Filed: Jul. 6, 2009

(65) Prior Publication Data
US 2010/0084247 A1    Apr. 8, 2010

(30) Foreign Application Priority Data
Jul. 7, 2008 (DE) .......................... 10 2008 040 204

(51) Int. Cl.
*B65G 15/60* (2006.01)
(52) U.S. Cl. .................. 198/805; 198/728; 198/729
(58) Field of Classification Search .............. 198/725, 198/728, 729, 805
See application file for complete search history.

(56) References Cited

U.S. PATENT DOCUMENTS

| 6,898 A | 11/1949 | Merryman | |
|---|---|---|---|
| 3,902,587 A * | 9/1975 | Checcucci | 198/419.3 |
| 4,801,003 A * | 1/1989 | Costa | 198/802 |
| 5,147,029 A * | 9/1992 | Wadell | 198/619 |
| 5,947,361 A | 9/1999 | Berger et al. | |
| 6,092,801 A * | 7/2000 | Abbadessa et al. | 271/204 |
| 6,607,073 B2 | 8/2003 | Buchi et al. | |
| 6,866,136 B2 * | 3/2005 | Veit et al. | 198/370.02 |

FOREIGN PATENT DOCUMENTS

| DE | 7529480 U | 4/1976 |
|---|---|---|
| DE | 2636604 A1 | 2/1978 |
| DE | 2852772 A1 | 7/1979 |
| DE | 3510008 A1 | 12/1985 |
| DE | 20107487 U1 | 9/2001 |
| DE | 102005019036 A1 | 10/2006 |
| EP | 1747844 A2 | 1/2007 |
| WO | 0226602 A2 | 4/2002 |

* cited by examiner

Primary Examiner — Joseph A Dillon, Jr.
(74) Attorney, Agent, or Firm — Ronald E. Greigg

(57) ABSTRACT

The invention relates to a transporting apparatus for transporting products, which includes a linear drive mechanism, a continuous conveyor system, having two parallel straight conveyor regions and two curved conveyor regions each connecting one end of the straight conveyor regions, and a plurality of conveyor elements. The conveyor elements extend along the continuous conveyor system and convey the products to be conveyed along at least a portion of the conveyor system while being guided along a guide path. The linear drive mechanism includes a first linear segment and a second linear segment, which are disposed parallel to the straight conveyor regions. The curved conveyor regions of the conveyor system are advantageously embodied as driveless.

15 Claims, 2 Drawing Sheets

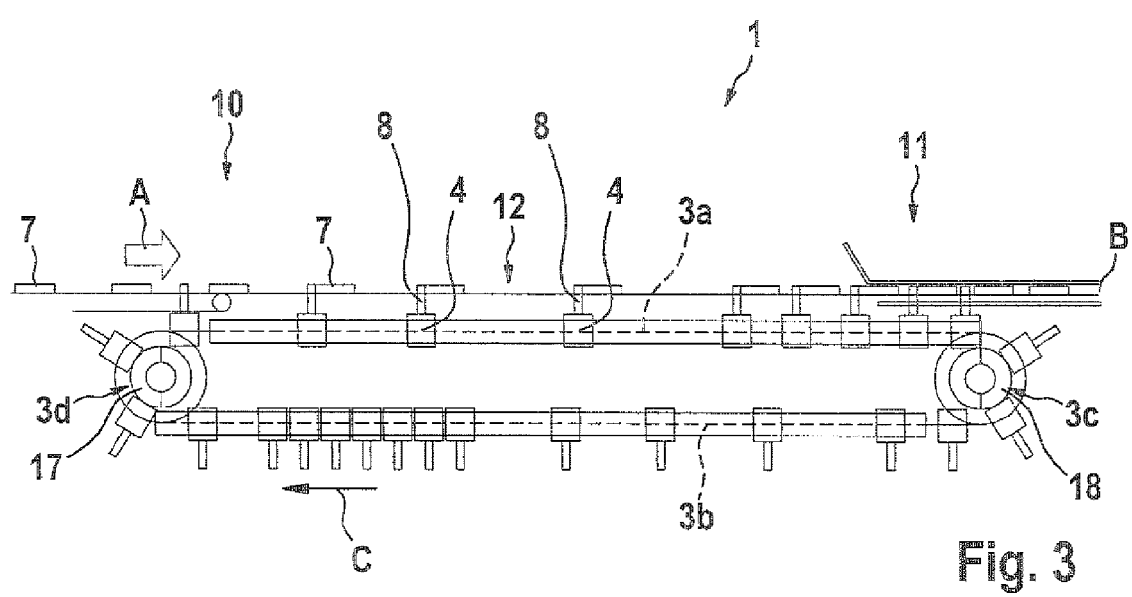

APPARATUS AND METHOD FOR TRANSPORTING PRODUCTS, HAVING A LINEAR DRIVE MECHANISM

CROSS-REFERENCE TO RELATED APPLICATION

This application is based on German Patent Application 10 2008 040 204.4 filed Jul. 7, 2008.

BACKGROUND OF THE INVENTION

1. Field of the Invention

The invention relates to an apparatus for transporting products with a linear drive mechanism between a first and a second station, and to a corresponding transporting method.

2. Description of the Prior Art

Apparatuses for transporting products are known in various embodiments from the prior art. Besides the known conveyor belts, recently linear drive mechanisms have increasingly been proposed as transporting apparatuses. From European Patent Disclosure EP 1 123 886 A1, for instance, one such apparatus with a linear drive mechanism is known, in which a continuous conveyor system is embodied as a linear motor, and individual conveyor elements each have a permanent magnet. The linear motor includes a plurality of coils, disposed side by side, which are disposed along the entire continuous conveyor system.

Such transporting apparatuses are used for instance for supplying packaging machines, in particular horizontal bag package making machines or cardboard box machines with unit loads (chocolate bars, bags, bottles). First, metering-in with accumulation being generated can be performed. This method can be used only with products amenable to accumulation, such as bottles. For metering in such products, which enter at various spacings, accumulation and acceleration belts are preferably employed. In the metering-in, the products touch one another with a defined dynamic pressure. Insertion into the actual packaging machine is then effected for instance via a finger chain with appropriate finger pitch. Alternatively, nonaccumulating metering-in can also be performed, and this can be used both with products not amenable to accumulation and with products that are amenable to accumulation. The incoming products do not touch one another, but instead maintain a certain minimum spacing on a belt. By means of highly dynamic, speed-regulated acceleration belts, the products are displaced to the requisite pitch spacing relative to one another and then transferred again, for instance to a finger chain. However, this requires many transfer points and results in a great structural length. Moreover, special format parts are necessary for type of product, so that upon a change of product, there is a corresponding need for resetting. Moreover, smooth products, in particular, can be conveyed only with severe restrictions.

ADVANTAGES AND SUMMARY OF THE INVENTION

The apparatus according to the invention for transporting products, having the has the advantage over the prior art of making safe, gentle product handling possible and can be used for many different products without complicated resetting work. In particular, special complicated format parts dependent on the product do not have to be changed. Moreover, the apparatus of the invention requires little space and can be furnished relatively inexpensively. This is attained according to the invention in that the transporting apparatus has a linear drive mechanism, which includes a first and a second linear segment and which is not disposed in curved conveyor regions. According to the invention, the complicated embodiment of the linear drive mechanism in the curved region of a continuous conveyor system can thus be dispensed with. The apparatus of the invention includes the continuous conveyor system, so as to return individual conveyor elements from a second station (output station) to a first station (intake station). Moreover, by the embodiment according to the invention, a very small radius in the curved region of the conveyor system can be attained, resulting in a very compact construction. Since furthermore the curved regions of the continuous conveyor system are designed as driveless, the transporting apparatus of the invention can be furnished especially inexpensively. According to the invention, transporting of the individual conveyor elements in the curved conveyor region of the conveyor system is effected by pushing trailing conveyor elements and/or by pulling leading conveyor elements that carry trailing conveyor elements along with them.

Preferably, the curved conveyor regions of the conveyor system each include one continuous driveless element. With this driveless element, the conveyor elements are transferred from the first linear conveyor region to the second linear conveyor region. Especially preferably, the continuous driveless element has form- and/or force-locking connecting devices in the curved conveyor region. Via these connecting devices, the continuous driveless element can be moved by the incoming and/or outgoing conveyor elements.

The continuous driveless element is preferably a continuous belt or a wire.

In a further preferred embodiment of the present invention, each conveyor element, on a side oriented toward an adjacent conveyor element, has a connecting element for a form-locking and/or force-locking connection. As a result, a simple connection of the conveyor elements in the region of the curved conveyor regions can be achieved, so that pushing or pulling the conveyor elements out of the curved conveyor region is possible in a simple way. Pulling the conveyor elements out is effected in such a way that when a conveyor element, after passing through the curved conveyor region, is positioned at the beginning of the second linear segment, this conveyor element is moved by the linear drive mechanism and simultaneously carries along with it a trailing conveyor element fastened detachably to it, until the trailing conveyor element too has reached the operative range of the second linear segment.

Especially preferably, each conveyor element includes a magnet element, for magnetically attracting or magnetically repelling an adjacent conveyor element in the curved conveyor region. Also as a result, a connection between adjacent conveyor elements, or further conveying action, can be attained by means of magnetic repulsion.

The apparatus according to the invention for transporting products is especially preferably used in packaging machines, especially in horizontal bag package making machines.

The present invention furthermore relates to a method for transporting products by means of a plurality of conveyor elements. The conveyor elements are moved along a continuous conveyor system, and the continuous conveyor system has two parallel, straight conveyor regions and two curved conveyor regions that connect the straight conveyor regions to one another. A linear drive mechanism serves as the drive mechanism. The curved conveyor regions are embodied as driveless, and the conveyor elements that are located in the curved conveyor region are fed through the driveless curved conveyor region by being pushed by trailing conveyor elements or pulled by leading conveyor elements. As a result, by indirect conveying of the conveyor elements in the region of the curves of the conveyor system, safe, economical conveying is attained. Moreover, the second straight conveyor region, which returns the conveyor elements to the outset position, is preferably used as a buffer, to make it possible to adapt the number of conveyor elements to fluctuating numbers of delivered products.

BRIEF DESCRIPTION OF THE DRAWINGS

The invention will be better understood and further objects and advantages thereof will become more apparent from the ensuing detailed description of preferred embodiments taken in conjunction with the drawings, in which:

FIG. 3 is a schematic top view on a transporting apparatus in a third exemplary embodiment of the invention.

DESCRIPTION OF THE PREFERRED EMBODIMENTS

Below, in conjunction with FIG. 1, a transporting apparatus 1 in a first exemplary embodiment of the invention will be described in detail.

Figure 1:
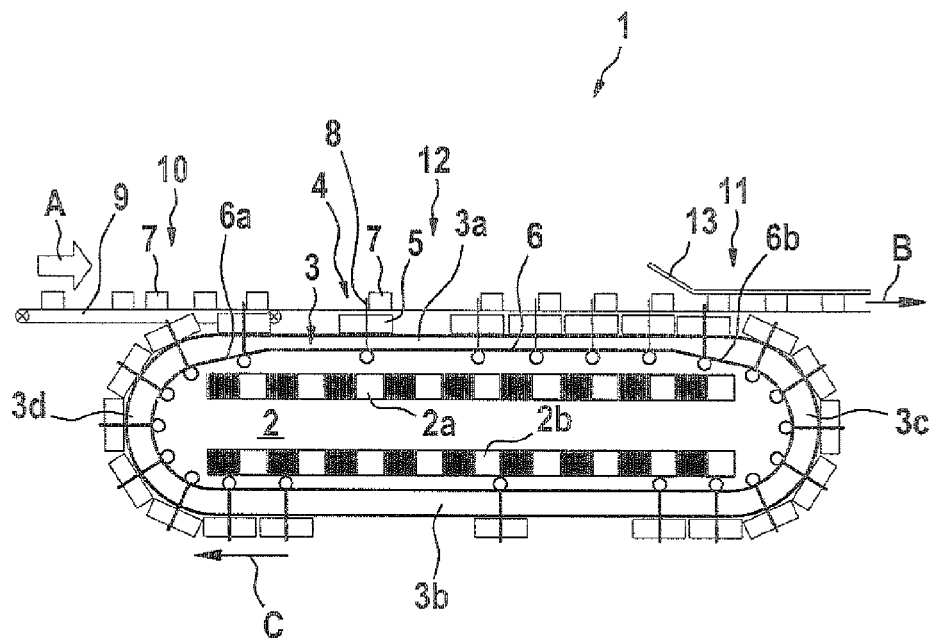
FIG. 1 is a schematic top view on a transporting apparatus in a first exemplary embodiment of the invention.

As can be seen from FIG. 1, the transporting apparatus 1 of the invention has a linear drive mechanism 2 with a first linear segment 2a and a second linear segment 2b. The two segments 2a, 2b are disposed parallel to one another and have the same length. The transporting apparatus 1 further includes a conveyor system 3, having a first and a second straight conveyor region 3a, 3b and a first and a second curved conveyor region 3c, 3d. The two curved conveyor regions 3c, 3d connect the two straight conveyor regions 3a, 3b. As a result, a continuous conveyor system is created on which a plurality of conveyor elements 4 can circulate. The conveyor elements 4 each include one permanent magnet 5 and one slide finger 8. As can be seen from FIG. 1, the slide finger 8 is guided on a continuous guide path 6, as a result of which it can vary its position relative to the conveyor system 3. As can be seen from FIG. 1, the slide fingers 8 are pushed forward and outward in the region of the first straight conveyor region 3a, in order to feed products 7 that are to be packaged to a linear conveyor system 12. The linear conveyor system 12 is disposed downstream of an intake zone 10, to which the products 7 are delivered by means of a conventional continuous belt conveyor 9. This is indicated in FIG. 1 by the arrow A. Downstream of the intake zone 10 is the linear conveyor system 12, and the linear conveyor system 12 is followed by a discharge zone 11. In the discharge zone 11, the products are packaged by means of a bag package making machine, not shown, into a tubular-bag package 13 and carried away, which is represented by the arrow B. The packaging process is likewise indicated only schematically in FIG. 1.

Thus as can be seen from FIG. 1, no drive mechanisms whatever are provided in the curved conveyor regions 3c and 3d. Since the conveyor elements 4 nevertheless have to be fed through the curved conveyor regions 3c, 3d, they are pushed through the curved conveyor region 3c by the trailing conveyor elements, which are located in the first straight conveyor region 3a. As can be seen from FIG. 1, the conveyor elements 4 are specifically moved in the straight conveyor regions 3a, 3b by means of the linear drive mechanism 2 in the direction of the arrow C. The straight conveyor regions 3a, 3b also serve as buffer regions for the products 7 conveyed upstream of the discharge zone 11 and for the empty conveyor elements 4 located in the region of the second straight conveyor region 3b.

The function of the transporting apparatus of the invention is as follows: The products 7 arrive at the transporting apparatus 1 via the intake zone 10 at varying speed and/or at varying spacings. As can be seen from FIG. 1, already at a beginning end of the guide path 6, the delivered products 7 are each received by a respective conveyor element 4, and each slide finger 8 is moved outward via an ascending ramp 6a and delivered to the conveyor system 12 by means of the linear drive mechanism 2, and more precisely the first linear segment 2a. The conveyor system 12 serves as a buffer region so that before the products are output in the discharge zone 11 to the packaging system, a continuous delivery of products 7 is assured. After the products have been transferred to the packaging part in the discharge zone 11, the slide fingers 8, as shown in FIG. 1, are retracted again, since on the guide path 6, a gravity incline ramp 6b is provided, oriented in the direction of the linear drive mechanism 2. The conveyor elements 4 are still being driven by the linear drive mechanism 2 at this time. As soon as the guide path 6 enters the curved portion, no further drive for the conveyor elements 4 is provided. They are therefore fed by the conveyor elements 4 pressing against them from behind, via the curved conveyor region 3c. At the end of the curved conveyor region 3c, the action of the linear drive mechanism 2 begins again, and the conveyor elements 4 can be fed onward by means of the second linear segment 2b. At the end of the second linear segment 2b, in the region in which the straight conveyor segment changes over again to the curved conveyor segment, once again there is no drive, so that the conveyor elements 4 moving into the curved conveyor region 3d are again pushed through by the conveyor elements 4 that move them onward intermittently. It should be noted that alternatively, the conveyor elements 4 may also be embodied such that the conveyor elements located in the curved conveyor region can be pulled out of the curved conveyor regions into the linear conveyor regions by pulling, for instance by means of a magnetic connection.

Thus in the transporting apparatus 1 of the invention, circulation in the curved conveyor region is passively attained, in that the conveyor elements 4 entering the curved conveyor region, which are still being driven by the linear drive mechanism 2, push the conveyor elements 4 located in the curved conveyor region 3c, 3d on through. The first conveyor elements in each curved conveyor region then arrive back again in the region of the migrating field of the linear drive mechanism 2, so that they can again be driven actively. Thus a transporting apparatus with driveless curved regions can be embodied. The straight conveyor regions 3a, 3b also serve as buffers for the empty conveyor elements 4 and for the products 7 to be conveyed. Moreover, by means of the linear drive mechanism 2, active conveyor regulation can be attained in the straight conveyor regions 3a, 3b. Since no drive mechanisms are provided in the curved regions, an especially compact construction can be made possible, and in particular, very short radii in the curves are possible. A further result is great freedom in terms of geometry of the curved regions, so that even the most various options for machines with limited space are still possible.

Figure 2:
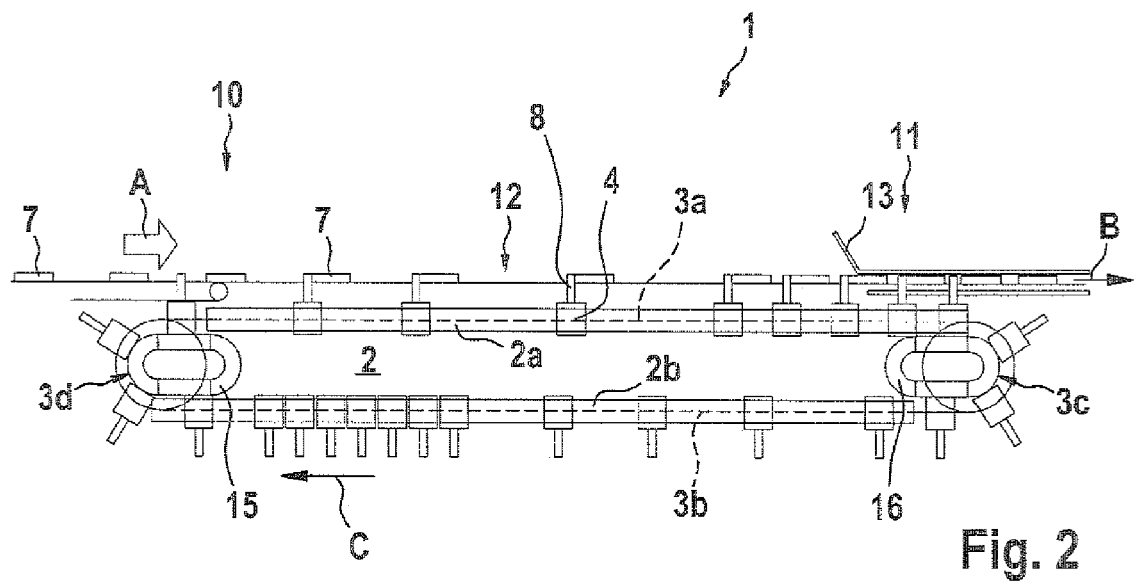
FIG. 2 is a schematic top view on a transporting apparatus in a second exemplary embodiment of the invention.

Below, in conjunction with FIG. 2, a conveyor system 1 in a second exemplary embodiment of the invention will be described in detail. Parts that are identical or functionally identical are identified by the same reference numerals as in the preceding exemplary embodiment.

In a distinction from the first exemplary embodiment, the transporting apparatus 1 of the exemplary embodiment has a passive continuous belt 15, 16 in each of the curved conveyor regions 3c, 3d. Such aids as outward-protruding elements that come into contact with the conveyor elements 4 are provided on the belts. As a result, the belts 15, 16 are likewise moved by the conveyor elements 4 that are driven by means of the linear drive mechanism 2, so that without their own drive mechanism, the belts feed the conveyor elements 4 through the curved conveyor regions 3c, 3d. Otherwise, this exemplary embodiment is equivalent to the first exemplary embodiment, so that the description of the latter can be referred to.

FIG. 3 shows a transporting apparatus 1 in a third exemplary embodiment of the invention; identical or functionally identical parts are identified by the same reference numerals as in the preceding exemplary embodiments. The third exemplary embodiment is essentially equivalent to the second exemplary embodiment, but instead of the continuous belt, in the third exemplary embodiment wheels 17, 18 are provided for deflection in the curved conveyor regions 3c, 3d. The wheels 17, 18 likewise have no drive mechanism of their own and have outward-protruding elements, so that the wheels are driven by the incoming and outgoing conveyor elements 4 and thereby feed the conveyor elements 4 over the curved conveyor regions 3c, 3d. Otherwise, this exemplary embodiment is equivalent to the preceding exemplary embodiments, so that the description of those exemplary embodiments may be referred to.

The foregoing relates to preferred exemplary embodiments of the invention, it being understood that other variants and embodiments thereof are possible within the spirit and scope of the invention, the latter being defined by the appended claims.

We claim:

1. A transporting apparatus for transporting products, comprising
    a linear drive mechanism;
    a continuous conveyor system, having two parallel straight conveyor regions and two curved conveyor regions which each connect to one end of the straight conveyor regions;
    a plurality of conveyor elements, which extend along the continuous conveyor system and convey the products to be conveyed along at least a portion of the conveyor system; and
    a guide path along which conveyor elements are guided at varying relative rates;
    a product support surface along which products are guided, at varying relative rates, by the conveyor elements;
    wherein the linear drive mechanism includes a first linear segment and a second linear segment which are disposed parallel to the straight conveyor regions, and wherein the curved conveyor regions of the conveyor system are embodied as driveless.

2. The apparatus as defined by claim 1, wherein the curved conveyor regions of the conveyor system each include one continuous driveless element.

3. The apparatus as defined by claim 2, wherein the continuous driveless element is drivable in the curved conveyor region by incoming conveyor elements and/or by outgoing conveyor elements.

4. The apparatus as defined by claim 2, wherein the continuous driveless element includes form-locking and/or force-locking connecting devices which are capable of being put into contact with incoming and/or outgoing conveyor elements.

5. The apparatus as defined by claim 3, wherein the continuous driveless element includes form-locking and/or force-locking connecting devices which are capable of being put into contact with incoming and/or outgoing conveyor elements.

6. The apparatus as defined by claim 2, wherein the continuous driveless element is a belt or a wheel.

7. The apparatus as defined by claim 3, wherein the continuous driveless element is a belt or a wheel.

8. The apparatus as defined by claim 4, wherein the continuous driveless element is a belt or a wheel.

9. The apparatus as defined by claim 5, wherein the continuous driveless element is a belt or a wheel.

10. The apparatus as defined by claim 1, wherein each conveyor element, on its side oriented toward an adjacent conveyor element, has connecting elements for a form-locking and/or force-locking connection.

11. The apparatus as defined by claim 2, wherein each conveyor element, on its side oriented toward an adjacent conveyor element, has connecting elements for a form-locking and/or force-locking connection.

12. The apparatus as defined by claim 3, wherein each conveyor element, on its side oriented toward an adjacent conveyor element, has connecting elements for a form-locking and/or force-locking connection.

13. The apparatus as defined by claim 1, wherein each conveyor element includes at least one magnet element, for attracting or repelling an adjacent conveyor element, particularly in the curved conveyor region, by means of magnetic force.

14. The apparatus as defined by claim 3, wherein each conveyor element includes at least one magnet element, for attracting or repelling an adjacent conveyor element, particularly in the curved conveyor region, by means of magnetic force.

15. The apparatus as defined by claim 4, wherein each conveyor element includes at least one magnet element, for attracting or repelling an adjacent conveyor element, particularly in the curved conveyor region, by means of magnetic force.

* * * * *